(12) United States Patent
Harrison et al.

(10) Patent No.: US 8,910,309 B2
(45) Date of Patent: Dec. 9, 2014

(54) CONTROLLING PUBLIC DISPLAYS WITH PRIVATE DEVICES

(75) Inventors: Justin Harrison, Seattle, WA (US); Donald M. Gillett, Bellevue, WA (US); Kenneth A. Lobb, Sammamish, WA (US); Arnold N. Blinn, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 13/311,362

(22) Filed: Dec. 5, 2011

(65) Prior Publication Data
US 2013/0143651 A1 Jun. 6, 2013

(51) Int. Cl.
G06F 15/16 (2006.01)
G06F 9/00 (2006.01)

(52) U.S. Cl.
USPC .......................................................... 726/30

(58) Field of Classification Search
CPC ................................. G06F 15/16; G06F 21/30
See application file for complete search history.

(56) References Cited

U.S. PATENT DOCUMENTS

| | | | |
|---|---|---|---|
| 7,003,574 B1 * | 2/2006 | Bahl ............................. | 709/228 |
| 7,515,136 B1 | 4/2009 | Kanevsky et al. | |
| 7,611,409 B2 * | 11/2009 | Muir et al. ...................... | 463/29 |
| 8,149,530 B1 * | 4/2012 | Lockton et al. .................. | 360/65 |
| 8,226,476 B2 * | 7/2012 | Haltovsky et al. .............. | 463/30 |
| 2003/0189385 A1 * | 10/2003 | Fujita ............................. | 310/181 |
| 2004/0002843 A1 * | 1/2004 | Robarts et al. .................. | 703/13 |
| 2004/0179040 A1 | 9/2004 | Patel et al. | |
| 2005/0021393 A1 | 1/2005 | Bao et al. | |
| 2006/0189382 A1 * | 8/2006 | Muir et al. ...................... | 463/29 |
| 2007/0021198 A1 | 1/2007 | Muir et al. | |
| 2008/0004953 A1 | 1/2008 | Ma et al. | |
| 2008/0057867 A1 | 3/2008 | Trappeniers et al. | |
| 2008/0194323 A1 * | 8/2008 | Merkli et al. ................... | 463/30 |
| 2009/0018911 A1 | 1/2009 | An Chang et al. | |
| 2010/0112148 A1 * | 5/2010 | Davidovici .................... | 426/134 |
| 2010/0123668 A1 | 5/2010 | Kuhn et al. | |
| 2010/0136952 A1 | 6/2010 | Rofougaran | |
| 2010/0299213 A1 | 11/2010 | Yeganeh | |
| 2011/0221656 A1 * | 9/2011 | Haddick et al. ................... | 345/8 |

(Continued)

OTHER PUBLICATIONS

Echtler, et al., "Suporting casual interactions between board games on public tabletop displays and mobile devices", 2009, Springer-Verlag, pp. 609-617.*

(Continued)

Primary Examiner — William Powers
(74) Attorney, Agent, or Firm — Aaron Chatterjee; Kate Drakos; Micky Minhas

(57) ABSTRACT

Techniques and tools for controlling public output devices (e.g., public display devices) with client devices over a network. In some examples, a time-limited proximity code is displayed by a public display device, and a client device can provide the code via a public network to verify that the client device is present within a proximity zone and is allowed to control the public display. Once authorized, the client device can provide control data to control visual content on the public display. A relay service can be used to relay data over a network via communication connections between client devices and public display devices. For example, the relay service can be implemented on a server connected to the network and can use HTTP (hypertext transfer protocol) to relay data such as control data via messages from one device to another.

20 Claims, 10 Drawing Sheets

(56) References Cited

U.S. PATENT DOCUMENTS

| | | | |
|---|---|---|---|
| 2012/0221657 A1* | 8/2012 | Zeevi et al. | 709/206 |
| 2012/0283018 A1* | 11/2012 | Berner et al. | 463/42 |
| 2013/0244784 A1* | 9/2013 | Assa | 463/40 |

OTHER PUBLICATIONS

"A Taxonomy for and Analysis of Multi-Person-Display Ecosystems" by Terrenghi et al., Ubiquit Comput (2009), 13:583-598).*

"Flashlight Jigsaw: An Exploratory Study of an Ad-Hoc Multi-Player Game on Public Displays" by Cao et al., ACM, CSCW'08, 2008, pp. 77-86.*

"Multi-User Mobile Applications and a Public Display: Novel Ways for Social Interaction" by Leikas et al., PERCOM'06, IEEE, 2006, pp. 1-5.*

"MobiLenin-Combining A Multi-Track Music Video, Personal Mobile Phones and a Public Display into Multi-User Interactive Entertainment" by Scheible et al., ACM, 2005, pp. 199-208.*

"Mobile Phone Interaction with Outdoor Advertisements", Ventura et al., CHI'08, 2008, pp. 1-7.*

"Mobile Personal Devices meet Situated Public Displays: Synergies and Opportunities" by Dix et al., HCI Book, 2009, pp. 1-26.*

"Coderrr: Facebook Chat API," http://coderrr.wordpress.com/2008/05/06/facebook-chat-api/, 18 pp. (May 6, 2008).

"MSN Messenger Protocol: General—HTTP Connections," http://www.hypothetic.org/docs/msn/general/http_connections.php, 5 pp. (Mar. 2003).

"BlinkenLight: Game Analysis" http://picklesbrain.com/games/31/blinkenlight-game-anaylsis/, 4 pp. (Apr. 2006).

Dix et al., "Mobile Personal Devices meet Situated Public Displays: Synergies and Opportunities" http://www.comp.lancs.ac.uk/~dixa/papers/MPD-SPD-2010/ 28 pp. (Feb. 2009).

Churchill et al., "Sharing Multimedia Content with Interactive Public Displays: A Case Study," DIS '04: Proceedings of the 5th conference on Designing Interactive Systems: Processes, Practices, Methods, and Techniques, 10 pp. (Aug. 2004).

International Search Report and Written Opinion from International Application No. PCT/US2012/066914, dated Feb. 28, 2013, 13 pages.

Myers, "Mobile Devices for Control," In proceedings of the 4th International Symposium on Mobile Human-Computer Interaction, pp. 1-8 (2002).

Dix et al., "Public Displays and Private Devices: a design space analysis," *CHI 2008*, Florence, 5th Apr. 2008, 6 pages.

* cited by examiner

CONTROLLING PUBLIC DISPLAYS WITH PRIVATE DEVICES

BACKGROUND

Electronic displays are increasingly common in public areas. Such displays may show content such as text, images, video or graphics, and the content may change over time (e.g., in a sequence of different advertisements). Sometimes, electronic displays in public areas are connected to a computer at a kiosk in a fixed location. A user at the kiosk can enter information into the computer, and the display may change in response to the entered information. However, such kiosks typically can accommodate only one user at a time, so the number of users that can affect the output of the display is limited. Moreover, such displays typically do not accept input from other computing devices. In some public settings, such as stadiums, a display can show SMS messages sent by mobile phone to a particular phone number (e.g., a phone number controlled by the public display). However, the content of SMS messages is limited to plain text, and significant latency (e.g., delays of several seconds, minutes, or more) can occur while waiting for SMS messages to be delivered to the target phone number, or while waiting for the content of the messages to be interpreted and filtered (e.g., by a human moderator) before being displayed.

With the increasing popularity and sophistication of mobile computing devices (e.g., tablet computers, smart phones), there exists a need for enhanced, real-time interactions with public displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In examples herein, techniques and tools are described for controlling public display devices with client devices over a network (e.g., the Internet). In some examples, a time-limited proximity code is displayed by a public display device, and a client device can provide the code via a public network to verify that the client device is present within a proximity zone (e.g., a visual proximity zone) and is allowed to control the public display. Once authorized, the client device can provide control data to control visual content on the public display. A relay service can be used to relay data over communication connections between client devices and public display devices over a network. For example, the relay service can be implemented on a server connected to the network and can use HTTP (hypertext transfer protocol) to relay data such as control data via messages from one device to another. The relay service can be useful, for example, where a security protocol restricts communications with public display devices or client devices (e.g., restricting direct access to public display devices or incoming communications on client devices).

The foregoing and other objects, features, and advantages of the invention will become more apparent from the following detailed description, which proceeds with reference to the accompanying figures.

DETAILED DESCRIPTION

Figure 1:
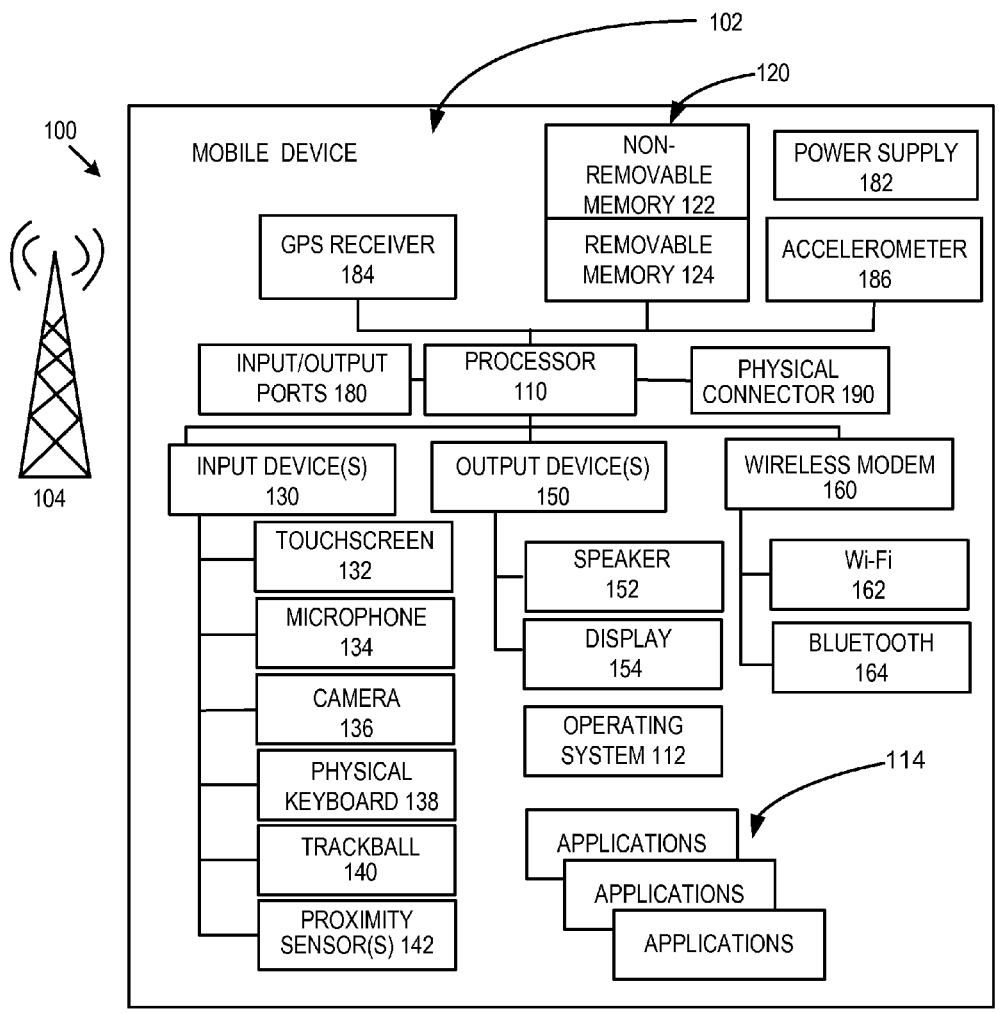
FIG. 1 illustrates a generalized example of a mobile computing device in which one or more described embodiments may be implemented.

Techniques and tools are described for controlling public display devices (or public output devices with other types of controllable output) with client devices (e.g., private computing devices such as mobile devices) over a network (e.g., the Internet). Described techniques and tools use proximity and/or authentication information to manage users that are permitted to control public displays. Security can be enhanced by restricting access by distant and/or anonymous users. In some examples, a proximity code (e.g., a visual proximity code such as a text string or an image such as a bar code) is displayed on the public display, and a user can provide the code (e.g., by typing the code on a keyboard, capturing an image of the code, or by some other method appropriate for the code) to verify that the user is present within a proximity zone and is allowed to control the public display. A relay service can be used to relay data over communication connections between client devices and public display devices over a network. For example, the relay service can be implemented on a server connected to the network and can use HTTP (hypertext transfer protocol) to relay data via messages from one device to another. Described techniques and tools can allow users to control public displays in a synchronous or near-synchronous manner, allowing direct control and interactivity with extremely low latency.

Described techniques and tools can be used with public output devices in a variety of settings (e.g., a large electronic billboard in Times Square; a scoreboard in a stadium, an interactive artwork in a gallery, museum, or building lobby; an advertising sign; or a device provided by a merchant for ordering goods in a retail store). Described techniques and tools can be used in a variety of interactive contexts. For example, a user can cause a public display to show the user's name or picture, or perform more complex actions such playing a game or controlling actions of an avatar associated with the user (e.g., waving, jumping, showing symbols, making hand gestures such as sign language). As another example, a user in a restaurant can cause a public display to show the user's order (e.g., in text, images and/or graphics). As another example, a user in a retail store can request a demonstration of a product or configure a product with options selected by the user on a public display. As another example, a user in a stadium can cause a picture of a favorite athlete or artist to appear on a display at the stadium. Such actions can be personalized. For example, an avatar, restaurant order, or a picture of a favorite athlete can be displayed along with a user's personal information (e.g., an image, name, or user ID) if desired by the user. Multiple users can interact with the same public display (e.g., controlling multiple avatars), or users can interact with each other on a public display (e.g., playing a game such as tennis or Pong). The number of users can be unlimited, but a limit on the number of users (e.g., first 100 users in an avatar display scenario, first two users in a tennis game scenario) may be desirable based on factors such as screen size, system resources (e.g., memory, communication bandwidth), and/or the content being controlled (e.g., a game with a limited number of players).

Described techniques and tools can be used with any number of displays of any size or type (e.g., a matrix of several small displays configured to show content as a single large virtual display, individual displays at different locations (e.g., on different sides of a room) linked together and showing related content). Described techniques and tools can be used to control other types of output in addition to visual output. For example, a user can provide input that causes audio output such as synthesized speech or other sounds.

Described techniques and tools provide benefits over other approaches for affecting public displays. For example, kiosks connected to public displays allow users to interact with the displays but unnecessarily limit the number of users (typically one per kiosk) that can interact with them. Described techniques and tools are not limited by input hardware, such as kiosks, that may be connected to a public display. As another example, although SMS messages sent by users via mobile phones can be used to affect public displays, the free-form content of SMS messages often requires human intervention to approve messages before displaying them, thereby increasing latency even beyond the normal latency present in delivery of SMS messages. Described techniques and tools allow for a discrete set of commands that can be used to avoid inappropriate interactions with public displays and reduce latency (e.g., latency introduced by human filtering processes). Although users can be instructed to send only particular SMS messages (e.g., "1" to perform a first action, "2" to perform a second action), this can become unwieldy for users. Described techniques and tools provide more intuitive, richer interfaces for controlling public displays. SMS messages are often sent to publicly available phone numbers, allowing users to send messages from remote locations. Described techniques and tools can be used to verify a user's presence within a proximity zone and restrict access by distant and/or unauthorized users.

The examples described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, repeated, or performed concurrently. As another example, systems described with reference to system diagrams can be altered by changing the ordering of elements or processing stages shown in the diagrams, by repeating or omitting certain elements or processing stages, etc. Moreover, for the sake of simplicity, the attached figures may not show the various ways in which the disclosed things and methods can be used in conjunction with other things and methods. Additionally, the description sometimes uses terms like "determine," "send," and "receive" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. The disclosed technology can be implemented by software written in C++, C#, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

I. Exemplary Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smart phone, handheld computer, tablet computer, etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 in various ways, and can provide support for one or more application programs 114. The application programs can include common mobile computing applications (e.g., image-capture applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as smart cards. The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined into a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

II. Generalized System

Figure 2:
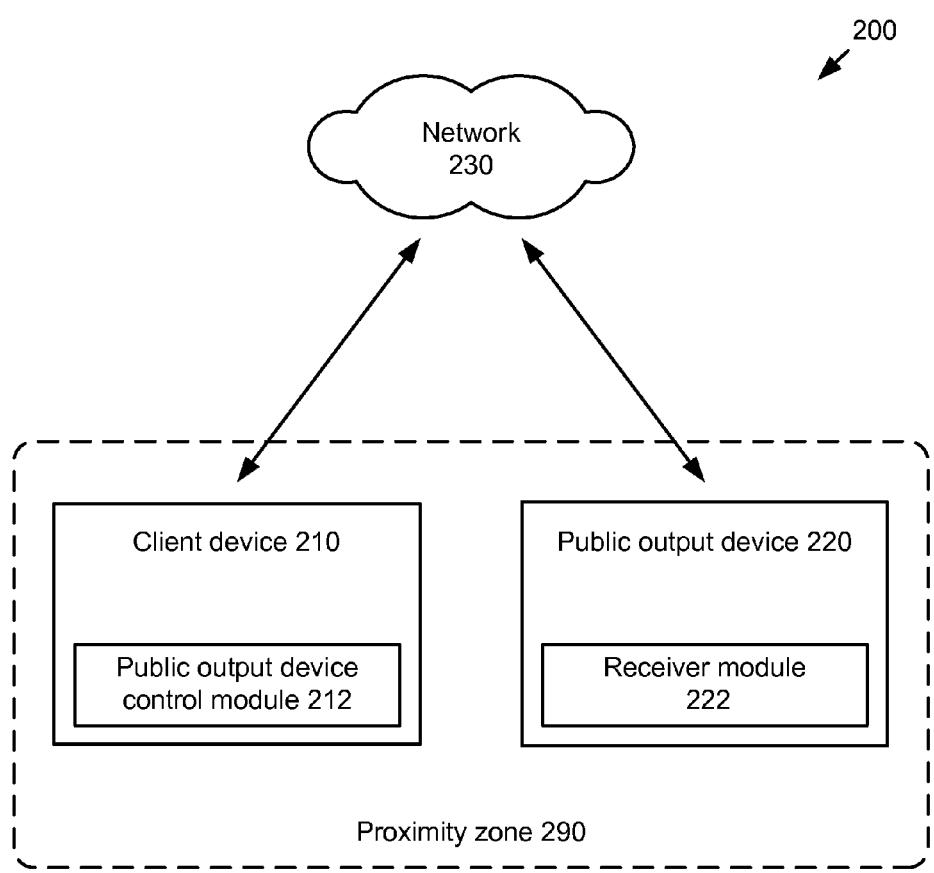
FIG. 2 is a block diagram showing a generalized system in which one or more described embodiments can be implemented.

FIG. 2 is a block diagram of an exemplary system 200 in which technologies described herein can be implemented. In the example, a client device 210 (e.g., a mobile device such as a smart phone or tablet computer) communicates with a public output device 220 (e.g., a display device in a public setting such as a building lobby or a city street) over a network 230 (e.g., a publicly accessible network such as the Internet). As used herein, the term "public output device" refers to a public device that provides output discernible by users, such as visual output, audio output, a combination of visual and audio output, or some other type of output. As used herein, the term "public" as applied to devices (e.g., public display devices) is used to describe devices that are capable of being controlled by more than one user and by more than one client device, but does not require such devices to be accessible by all conceivable users or to be in a location that is accessible to the general public. For example, a public display device may be located in a private residence or business, and may be accessible only to residents or employees, respectively.

The client device 210 can be a general purpose computing device (e.g., a smart phone or tablet computer) or a special-purpose device (e.g., a device specifically designed to interact with the public output device 220). The client device 210 need not be owned by a user that wishes to control the public output device 220. For example, the client device 210 can be loaned to the user for the purpose of controlling the public output device 220. Loaned devices can be used in settings such as museums where users viewing a particular exhibit with a public display device can verify proximity (e.g., by verifying their presence in a room that contains the exhibit) and then control the public output device. The public output device 220 receives control data (e.g., display control data from the client device 210), and performs output operations (e.g., displaying content) responsive to the control data. The receiver module 222 can interpret control data at the public output device 220. For example, the receiver module 222 receives and interprets control data from the client device 210 to determine output operations (e.g., displaying an avatar, displaying user actions in a game) to be performed by the public output device 220.

In any of the described examples, a relay service can be used to relay data over communication connections between the client device 210 and the public output device 220 over the network 230. For example, the relay service can be implemented on a server (not shown) connected to the network 230. The relay service can use simple HTTP (hypertext transfer protocol) to relay data from one device to another. The relay service provides flexibility in communication between devices in some scenarios, such as when security concerns mitigate against direct communication between the client device 210 and the public output device 220. For example, mobile phone carriers sometimes require mobile phones to use NAT (network address translation) and/or firewalls to restrict inbound connections. Public output devices may have similar restrictions on inbound connections while being more tolerant of outbound connections, which may involve a lesser degree of security risk.

Some examples described herein use messages sent over HTTP to establish connections between senders (e.g., client device 210) and receivers (e.g., public output device 220) and use such connections to send data. For example, the receiver module 222 of public output device 220 can generate messages to open communication sessions, close communication sessions, and receive control data from the client device 210. The public output device control module 212 of client device 210 can generate messages to register with open communication sessions and send control data to the public output device 220. The public output device control module 212 and the receiver module 222 can be implemented in different ways (e.g., in hardware or software). For example, the public output device control module 212 can be implemented as a custom control application (not shown) on the client device 210, or a user can navigate to a web page (not shown) associated with control of the public output device 220. The custom control application or web page can provide computer program code to act as the public output device control module 212.

In some scenarios, it is desirable to limit access to public output devices to users that are in a local area (e.g., to avoid disruption by intruders at remote locations). As used herein, the term "proximity" is used to describe a measure of closeness (e.g., physical distance) between devices (e.g., the client device 210 and the public output device 220). In the example shown in FIG. 2, the client device 210 is within a proximity zone 290 which also includes the public output device 220. The presence of the client device 210 within the proximity zone 290 indicates that the client device is considered to be close enough to control the public output device 220.

In any of the examples described herein, proximity can be based on distance from the public output device, context (e.g., co-location of a client device and a public output device within a venue), or some combination of distance and context. For example, a user in a stadium holding a mobile phone at a distance of 150 m from a public display on the opposite side of the stadium can be considered within a proximity zone, while a user outside the stadium but only 100 m from the public display can be considered outside the proximity zone. Proximity can be measured explicitly. For example, the position of a client device can be calculated by GPS or network-based localization. The position of a client device also can be approximated. For example, communication technology (e.g., Bluetooth) with limited range (e.g., 50 m) can be used to determine whether the client device is within the range of a public output device, even if the exact position of the client device is not known. As another example, if the client device joins a local wireless network to which the public output device is connected, a system can imply that the client device is within a proximity zone that covers the range of the local wireless network. A user of a client device can be given notice of the collection of any location data and the opportunity to provide or deny consent to collection of location data. Consent can be given in the form of opt-out consent, in which the user can take an affirmative action to prevent collection of location data before it is collected, or opt-in consent, in which the user can take an affirmative action to give consent to collection of location data before the data is collected.

Although useful, many of the proximity measures described above also have drawbacks. For example, GPS coordinates can be impersonated by intruders that may attempt to gain unauthorized control of a public output device, or by legitimate users that may attempt to circumvent proximity restrictions. As another example, requiring Bluetooth or local network connections to verify proximity can be inconvenient for some users. Accordingly, in any of the described examples other proximity measures (e.g., visual proximity, audio proximity, or some other measure of proximity) can be used. For example, proximity codes displayed at public output devices (e.g., display devices) can be used for determining visual proximity. In some described examples, by displaying a proximity code on a public display device, a system can imply that a user is within a visual proximity zone if the user is able to provide the code, even if the exact position of the client device is not known. The size and shape of a visual proximity zone can vary based on factors such as the size of a displayed code, or the size or viewing angle range of the display itself. As another example, tones or other audio signals (e.g., audible by human ears or not audible by human ears) can be used for determining audio proximity. In some described examples, tones transmitted by a public display device or a client device can be received by the other device and used to verify audio proximity. The size and shape of an audio proximity zone can vary based on factors such as strength of the audio signal or acoustics of a particular venue. Alternatively, other signals or protocols can be used to verify proximity.

Different proximity measures can be used to verify different degrees of proximity (e.g., different distance ranges or directions from public output devices). For example, a public display device can display a code that is visible by user within a particular venue (e.g., a stadium) and/or within a limited viewing angle. As another example, a public display device can transmit a tone that is detectable by a client device inside or outside a particular venue and/or in any direction from the public display device. Different proximity measures can be used independently or in combination with one another.

A user interacting with a public output device can send commands to control the public output device. These commands can be from a limited set of commands (e.g., commands for controlling particular visual content on a display device). Although other data (e.g., free form text or images) also can be sent to the public output device, a limited set of commands can be useful for, e.g., keeping the content appropriate for public viewing.

Exemplary client devices, public output devices, proximity measures, user interfaces, controllable content, communication protocols, and control scenarios are described in detail below.

In practice, the systems described herein such as system 200 can be more complicated, with additional functionality, more complex relationships between system components, and the like. The technologies described herein can be generic to the specifics of operating systems or hardware and can be applied in a variety of environments to take advantage of the described features.

III. Exemplary Arrangements

Figure 3:
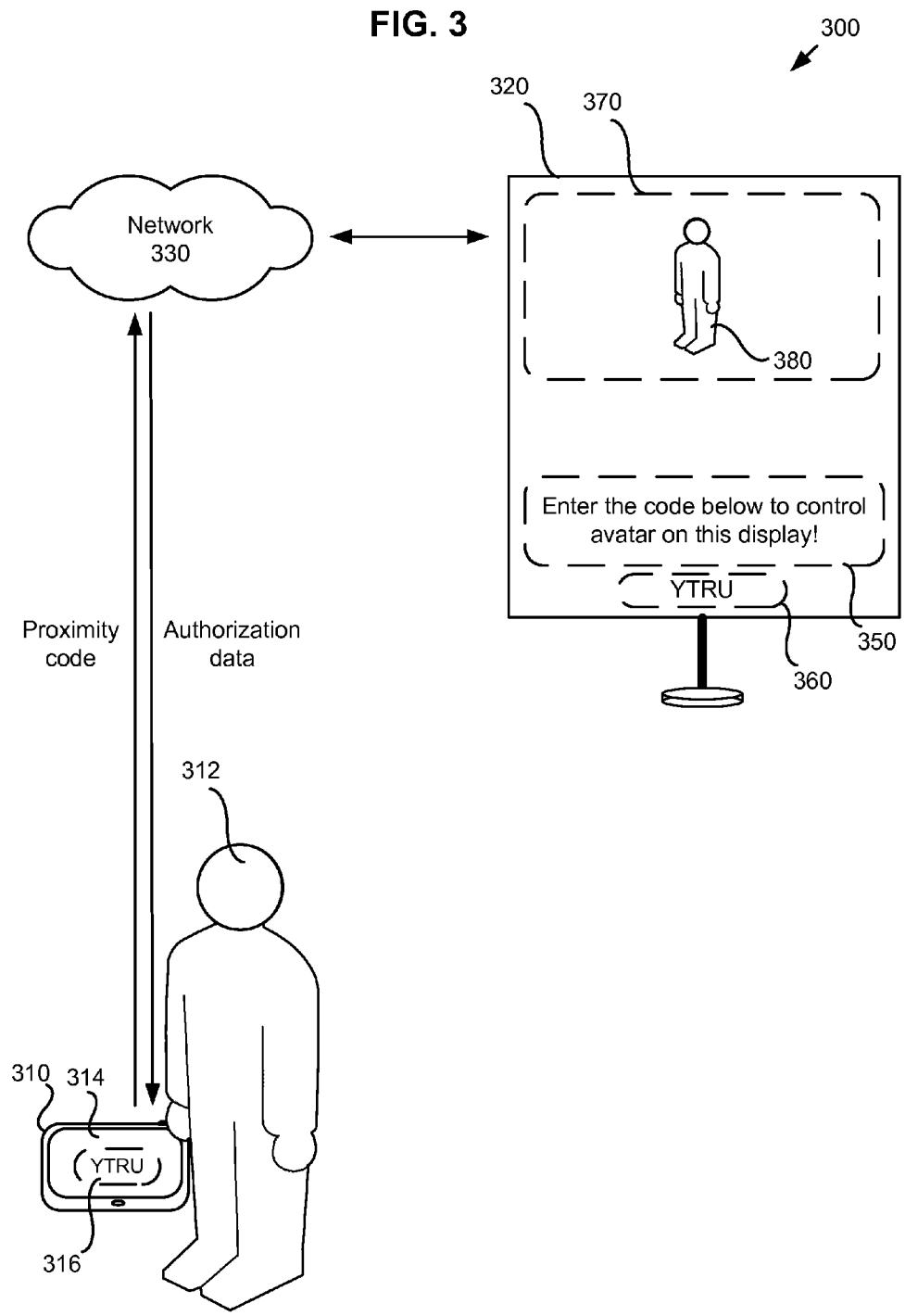
FIG. 3, FIG. 4, FIG. 5 and FIG. 6 are diagrams showing exemplary arrangements in which a public display device can be controlled by one or more mobile devices, according to one or more described embodiments.

FIG. 3 is a diagram of an exemplary arrangement 300 in which technologies described herein can be implemented. In the example, a mobile device 310 (e.g., a mobile phone, a tablet computer) controlled by a user 312 is authorized to control a public display device 320 (e.g., by controlling an avatar 380) over a network 330. The public display device 320 includes a controllable display area 370 and also displays instructions 350 and a proximity code 360. As shown, the instructions 350 guide users to enter the proximity code 360 in order to control an avatar 380 in the controllable display area 370. Alternatively, the instructions 350 differ from those shown in FIG. 3 or are omitted. The mobile device 310 includes a display 314 (e.g., a touchscreen display) and a user interface 316 on which the proximity code 360 is shown as being entered by the user 312.

In any of the examples described herein, the authorization of a user and/or client device to control a public output device can be determined from the confirmation of a proximity code. Confirmation of a proximity code can involve, for example, comparing (e.g., by a server) a proximity code transmitted by a client device with one or more legitimate codes (e.g., a single legitimate code, a set of legitimate proximity codes in a database). Legitimate codes can be generated and transmitted codes can be confirmed by a public display device or some other device (such as a server). Legitimate codes can be stored, for example, in memory or other storage of a public display device or some other device (such as a server). When the transmitted proximity code is confirmed, the client device can receive authorization data. Authorization data can include, for example, an authorization code or an identifier, such as a session ID, for a communication session with a public display device. The same proximity code can be used by more than one user. Proximity codes can be used in combination with other information to verify proximity. For example, to verify a user's presence in a stadium, a user can provide a proximity code along with, e.g., GPS location information, a seat number, or an additional code on a printed ticket.

In any of the examples described herein, proximity codes can be time-limited proximity codes, which are valid for a limited period of time. Different proximity codes for different time periods can be displayed as time passes. Such codes can be referred to as rotating codes. The confirmation of a time-limited proximity code can show that a user is not using an expired code (e.g., a code by the user on a prior day). The current presence of the user can be implied from the confirmation of the code.

In any of the examples described herein, proximity codes can comprise visual information such as text, graphics (e.g., linear barcodes or two-dimensional barcodes such as QR codes), images, or any other suitable visual information. Proximity codes also can comprise audio information such as a single tone or a set of tones, or any other suitable audio information. In any of the examples described herein, users can input proximity codes by typing on a touchscreen or keyboard, by speaking the code into a microphone, by capturing an image of the code using a camera, or by some other user input mechanism. The type of input used can vary based on, for example, available input devices, user preferences, and the type of code. For example, a camera device can be used to capture an image of a two-dimensional barcode. Alternatively, proximity codes can be obtained by client devices in some other way (e.g., without user interaction).

In the example shown in FIG. 3, the mobile device 310 transmits the proximity code 360 over the network 330. When the transmitted proximity code is confirmed (e.g., by a server (not shown) on the network 330), the mobile device 310 receives authorization data. The avatar 380 shown in the controllable display area 370 is ready to be controlled by the user 312. The avatar 380 can be associated with the user 312 or another user, or with no particular user.

Figure 4:
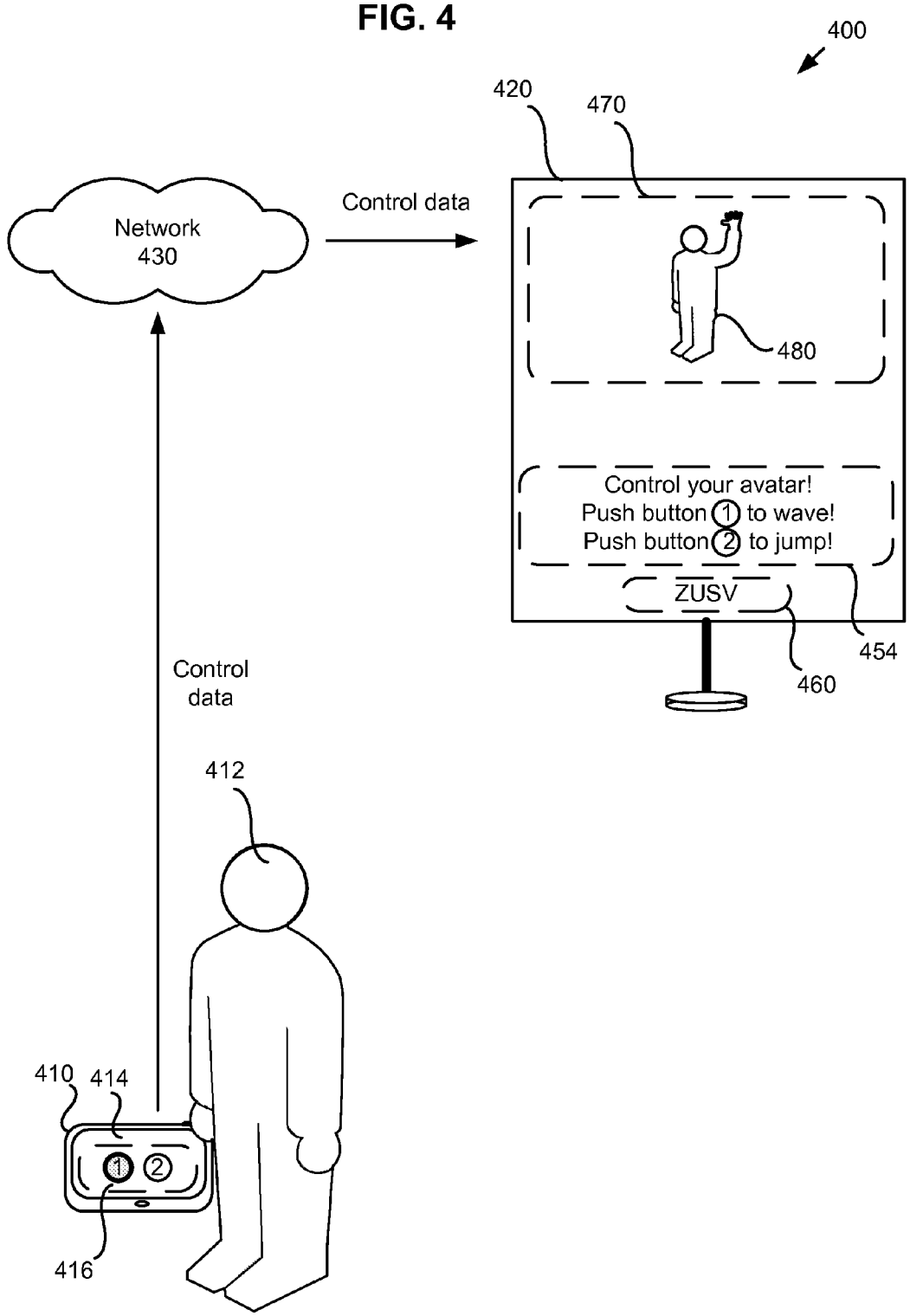

FIG. 4 is a diagram of another exemplary arrangement 400 in which technologies described herein can be implemented. In the example, a mobile device 410 controlled by a user 412 sends control data to control a public display device 420 over a network 430. The public display device 420 includes a controllable display area 470 and also displays instructions 450 and a proximity code 460. As shown, the instructions 450 guide the user 412 to activate buttons (e.g., software buttons in a graphical user interface) labeled "1" or "2" to cause the avatar 480 to wave its hand or jump, respectively. Alternatively, the instructions 450 differ from those shown in FIG. 4 or are omitted.

The mobile device 410 includes a display 414 (e.g., a touchscreen display) and a graphical user interface 416 in which software buttons labeled "1" and "2" are shown, with the button labeled "1" being highlighted to show activation by the user 412. The user interface 416 can be provided by a custom control application, by a web page, or by some other software or hardware component.

In any of the examples described herein, users can activate user interface elements (e.g., software buttons) in user interfaces by tapping on a touchscreen or pressing a key on a keyboard, by speaking into a microphone, or by some other input mechanism. The type of input used can vary based on, for example, available input devices and user preferences.

In the example shown in FIG. 4, the proximity of the mobile device 410 has been confirmed by transmission of the proximity code 460. The mobile device 410 transmits control data (e.g., control data corresponding to the user's selection of the button labeled "1") over the network 430 to public display device 420. The avatar 480 shown in the controllable display area 470 is waving its hand, responsive to the control data sent by the mobile device 410.

Figure 5:
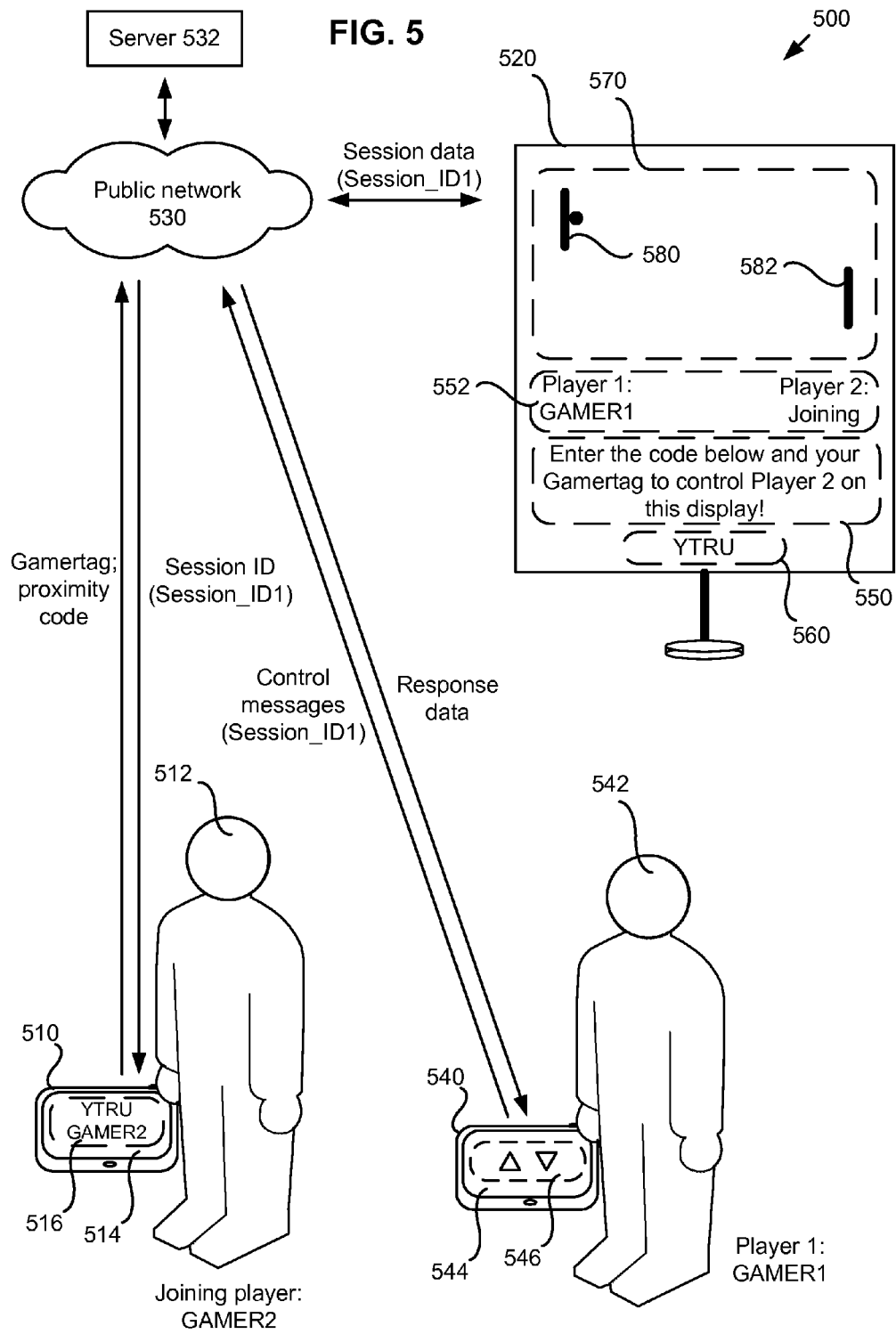

FIG. 5 is a diagram of another exemplary arrangement 500 in which technologies described herein can be implemented. In the example, mobile devices 510, 540 controlled by users 512, 542, respectively, communicate with a public display device 520 over a public network 530 (e.g., the Internet). The public display device 520 includes a controllable display area 570 with game elements 580, 582 that can be controlled by the users 512, 542. The public display device 520 also displays instructions 550, a status area 552, and a proximity code 560. As shown, the instructions 550 guide users to enter the proximity code 560 along with a user ID (e.g., a "Gamertag") to join the game shown in controllable display area 570. Alternatively, the instructions 550 differ from those shown in FIG. 5 or are omitted.

In the example shown in FIG. 5, user IDs are used to authenticate the users 512, 542. The exemplary user IDs shown in FIG. 5 are "Gamertags," which are publicly visible user IDs unique to the users 512, 542 and pre-registered with an online service (e.g., Microsoft Xbox Live). Gamertags also can be associated with a personalized avatar (not shown in FIG. 5) which be rendered on public display device 520. Alternatively, other types of user IDs can be used for authentication (e.g., private user IDs that are not displayed on the public display device 520), or authentication data other than user IDs can be used. For example, cryptographic information such as a security token (e.g., a security token issued by a security token service (STS)), authentication credentials stored on the client device, or other information can be used for authentication. As indicated in the status area 552, the game element 580 ("Player 1") is being controlled by user 542 (Gamertag: "GAMER1"). User 512 (Gamertag: "GAMER2") is joining the game to control game element 582 ("Player 2"). Alternatively, the information in the status area 552 differs from the information shown in FIG. 5 or is omitted.

In any of the examples described herein, various authentication mechanisms (e.g., OpenID, OAuth, Microsoft Windows Live ID) can be used, either independently or in combination with each other or with other authentication mechanisms described herein. For example, the Microsoft Windows Phone platform can authenticate some applications automatically using a Windows Live ID and a corresponding Gamertag. Applications also can use custom authentication mechanisms specific to the application. For example, a custom control application downloaded to a mobile device can use a custom user ID and password to authenticate users that wish to control a public display device. Tokens can be passed to a server via a communication protocol described herein, and the server can analyze the tokens to determine whether a particular user and client device will be permitted to control the public display device. Alternatively, users can be identified without strong authentication credentials. For example, a user could enter their name (e.g., after preregistering their name with a public display device service), an unregistered user ID, or someone else's name or user ID, to be displayed on the screen. As another alternative, users can be anonymous.

In the example shown in FIG. 5, the users 512, 542 use their mobile devices 510, 540 to communicate in a shared communication session (labeled "Session_ID1") with the public display device 520 via HTTP over the public network 530. The server 532 provides a relay service to relay messages generated by the public display device 520 and the mobile devices 510, 540. The public display device 520 can generate messages to open and close the communication sessions and messages to obtain control data (e.g., control data sent in control messages from mobile devices 510, 540). The mobile devices 510, 540 can generate messages to register with open communication sessions and send control data that can be used to control content on the public display device 520.

The mobile device 510 includes a display 514 (e.g., a touchscreen display) and a user interface 516 on which the proximity code 560 and a Gamertag ("GAMER2") are shown as being entered by the user 512. Alternatively, the proximity code 560 and Gamertag (or other authentication information) can be provided to the mobile device 510 without user action and/or without being displayed on display 514. In the example shown in FIG. 5, the mobile device 510 transmits the proximity code 560 along with authentication information (e.g., the Gamertag associated with the user 512) over the public network 530. The mobile device 510 receives a response (e.g., from server 532) including a session identifier ("Session_ID1") that corresponds to an open HTTP session between the mobile devices 510, 540 and the public display device 520. The mobile device 510 can transmit a message (e.g., to server 532) that includes the session identifier in order to register with the open communication session and allow the user 512 to join the game.

The mobile device 540 includes a display 544 e.g., a touchscreen display) on which up and down arrow buttons are shown in a graphical user interface 546. The graphical user interface 546 can be provided by a custom control application, by a web page, or by some other software or hardware component. In the example shown in FIG. 5, the proximity of the mobile device 540 has already been confirmed (e.g., by transmission of the proximity code 560), and the mobile device 540 has registered with the open communication session (e.g., by sending a message with the session identifier) in order to allow the user 542 to join the game. The mobile device 540 transmits control data (e.g., display control data corresponding to the user's selection of up or down movements of the game element 580) via control messages over the public network 530. The mobile device 540 also can receive response data (e.g., from server 532) which can indicate, for example, that a control message has been relayed successfully to the public display device 520.

Figure 6:
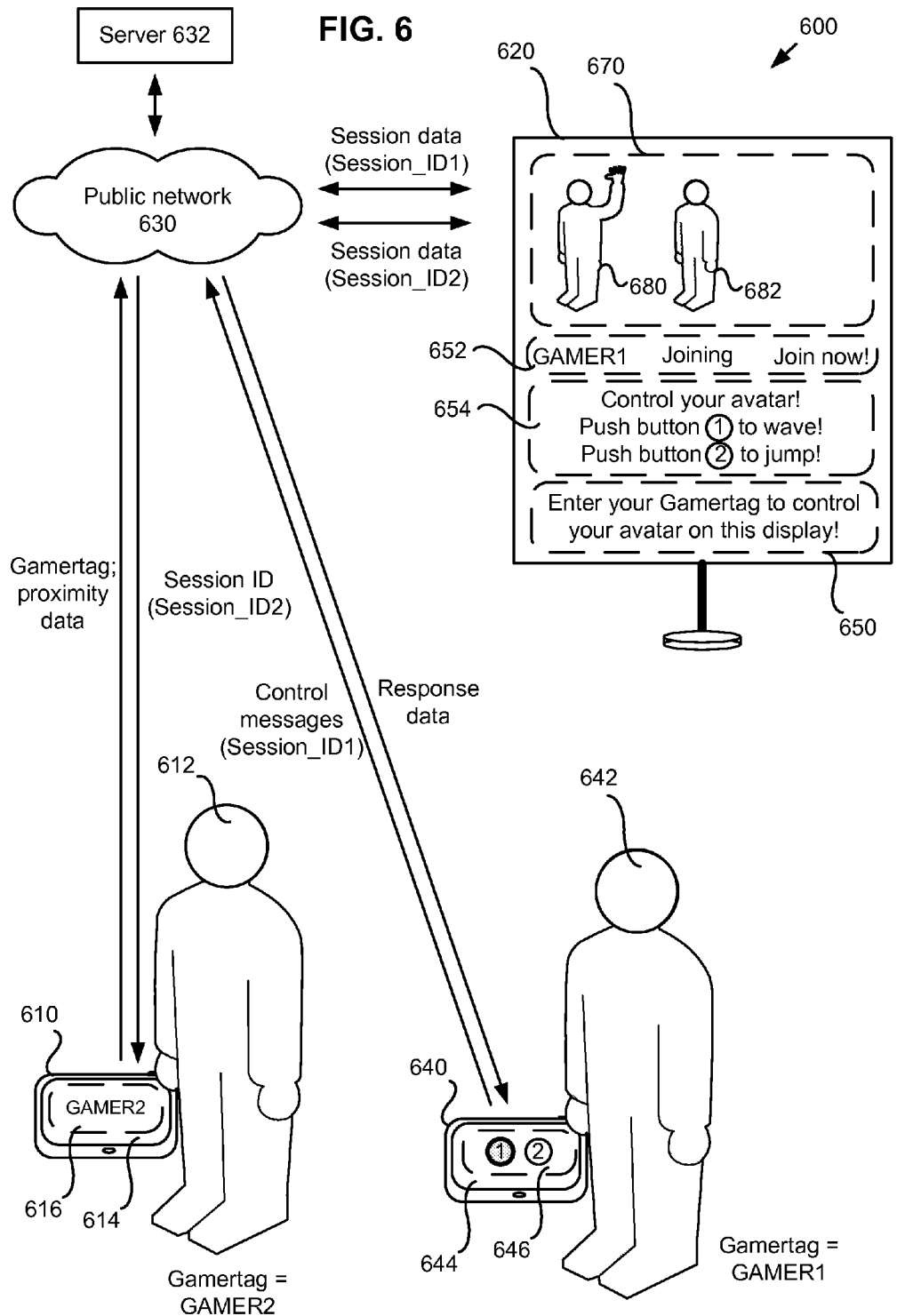

FIG. 6 is a diagram of another exemplary arrangement 600 in which technologies described herein can be implemented. In the example, mobile devices 610, 640 controlled by users 612, 642, respectively, communicate with a public display device 620 over a public network 630 (e.g., the Internet). The public display device 620 includes a controllable display area 670 with avatars 680, 682 associated with users 612, 642, respectively. The public display device 620 also displays instructions 650, 654 and a status area 652. As shown, the instructions 650 guide users to enter a user ID (e.g., a "Gamertag") in order to control an avatar associated with the user ID in controllable display area 670. The instructions 654 guide users to activate buttons (e.g., software buttons in a graphical user interface) labeled "1" or "2" to cause avatars to wave a hand or jump, respectively. As indicated in the status area 652, the avatar 680 is being controlled by user 642 (Gamertag: "GAMER1"), user 612 (Gamertag: "GAMER2") is joining to control avatar 682, and another portion of the controllable display area 670 is indicated as being available (as indicated by the text "Join now!") for another user (not shown) to display and control another avatar (not shown). Alternatively, the instructions 650, 654 and/or information in the status area 652 differ from the information shown in FIG. 6 or are omitted.

In the example shown in FIG. 6, the users 612, 642 use their mobile devices 610, 640 to communicate in separate communication sessions (labeled "Session_ID1" and "Session_ID2," respectively) with the public display device 620 via HTTP over the public network 630. The server 632 provides a relay service to relay messages generated by the public display device 620 and the mobile devices 610, 640. The public display device 620 can generate messages to open and close the communication sessions and messages to obtain control data (e.g., control data sent in control messages from mobile devices 610, 640). The mobile devices 610, 640 can generate messages to register with open communication sessions and send control data that can be used to control content on the public display device 620.

The mobile device 610 includes a display 614 (e.g., a touchscreen display) on which the Gamertag ("GAMER2") associated with the user 612 is shown. Alternatively, the Gamertag (or other authentication information) can be provided to the mobile device 610 without user action and/or without being displayed on display 614. In the example shown in FIG. 6, the mobile device 610 transmits the Gamertag along with proximity data (e.g., GPS position data and/or a proximity code) over the public network 630. The mobile device 610 receives a response (e.g., from server 632) including a session identifier ("Session_ID2") that corresponds to an open HTTP communication session. The mobile device 610 can transmit a message (e.g., to server 632) that includes the session identifier in order to register with the open communication session and allow the user 612 to control the avatar 682.

The mobile device 640 includes a display 644 (e.g., a touchscreen display) and a graphical user interface 646 in which software buttons labeled "1" and "2" are shown, with the button labeled "1" being highlighted to show activation by the user 642. The user interface 646 can be provided by a custom control application, by a web page, or by some other software or hardware component. In the example shown in FIG. 6, the proximity of the mobile device 640 has already been confirmed (e.g., by transmission of proximity data), and the mobile device 640 has registered with an open communication session (e.g., by sending a message with the associated session ID) associated with Session_ID1 in order to allow the user 642 to control the avatar 680. The mobile device 640 transmits control data (e.g., control data corresponding to the user's selection of actions to be performed by the avatar 680) via control messages over the public network 630. The mobile device 640 also can receive response data (e.g., from server 632) which can indicate, for example, that a control message has been relayed successfully to the public display device 620.

Alternatives to the examples shown in the arrangements 300, 400, 500, 600 are possible. For example, the public display devices 320, 420, 520, 620 can display different content that is controllable by users. As another example, the content displayed by the public display devices 320, 420, 520, 620 can be controlled in some other way. In practice, arrangements described herein such as the arrangements 300, 400, 500, 600 can be more complicated, with additional functionality, more complex relationships between devices, and the like. The technologies described herein can be generic to the specifics of operating systems or hardware and can be applied in a variety of environments to take advantage of the described features.

IV. Exemplary Protocol

This section describes an exemplary communication protocol for controlling public displays with private devices. The exemplary communication protocol can be used in arrangements such as arrangements 500, 600 described above, or in some other arrangement.

In this exemplary communication protocol, there are two ends to an exchange of messages and data through a relay service: the receiving end (e.g., a public display device) and the sending end (e.g., a client device being used to control the public display device). The receiving end can be referred to as the receiver, and the sending end can be referred to as the sender. The relay service is implemented on a relay server in communication via HTTP with the receiver and the sender. To achieve fast communication between the sender and the receiver, the relay server performs connection parking. For example, when the receiver attempts to receive data from the sender, if there is no data to receive (e.g., because the sender hasn't sent any) the relay server parks the receiver's connection by leaving it open until there is data to receive. As another example, the relay service can park the sender's connection to wait for an open connection to become available from the receiver. The time that connections can be left open can be limited (e.g., to avoid parking connections that are not actually being used) to a finite period of time, such as a few minutes for a receiver's connection when awaiting data from a sender, or a few seconds for a sender's connection when awaiting an open connection from a receiver. When a diem makes a request to a server and the server parks the request, the server can determine the amount of time to park the connection. However, underlying operating system libraries on the client may impact how long the client will wait (e.g., one minute) for a parked connection to return. The server can respond (e.g., within one minute, or some other suitable time period, which may be enforced by client libraries) to a request that is parked but still has no response. By parking connections, the relay service can efficiently process asynchronous requests in a nearly synchronous manner.

In this exemplary communication protocol, the receiver has three message types: OpenSession, CloseSession, and Receive. OpenSession opens a session for a sender to connect to. It passes in two parameters: a session identifier (or session ID) and an access token. For example, the session identifier can be a GUID that is cryptographically unique for the session or interaction with a user, and the access token can be a string (e.g., a short text code to facilitate easy entry (e.g., by typing) by a user) or some other type of information (e.g., an image of a bar code, audio information such as a tone or a set of tones). CloseSession closes the session, and takes a session identifier as a parameter. OpenSession and CloseSession behave as synchronous calls and return right away. Receive takes the session identifier and returns data sent from the sender. The data returned by Receive includes the control data from the sender, and the identity of the sender. If there is no data to return, the relay server parks the connection until there is data to return, or until a timeout threshold is reached. When the receiver receives data (e.g., sender-generated data or a message from the relay server indicating that no data has been received after a timeout), the receiver can perform an action. For example, the receiver can cause the display to change based on control data received from the sender, close an inactive session (e.g., after a timeout threshold has been reached), open a new session (which also can be parked, if appropriate), and/or ask the relay service for more data (e.g., via another Receive message). If a connection is parked, after a period of time (e.g., one minute) where no data is available the relay server can return a code indicating that no data is available and the receiver can issue a new request for data as an alternative to closing the connection, allowing the receiver to be more tolerant of waiting for data.

In this exemplary communication protocol, the sender has two message types: Register and Send. The Register message is used to connect to an open session. The Register message takes an access token as a parameter and returns a session identifier if available. The sender can store the session identifier, for example, in an HTTP cookie. If there is no open session available, the relay service can return an error or park the sender's connection for a period of time (e.g., a few seconds) to see if an open session becomes available from the receiver. The Send message is used to transmit a command to the receiver. The Send message takes a command (e.g., a byte array or string) and a session identifier as parameters and returns a flag indicating "true" if the command was sent to the receiver and "false" if the command was not sent to the receiver. The relay server waits until the command has been sent to the receiver before returning "true" to the sender. If the data was not sent to the receiver (e.g., if there was no corresponding open session, or if there was no Receive request from the receiver), the relay server returns "false" (e.g., after a timeout threshold has been reached, such as a few seconds) and the sender can take appropriate action (e.g., alerting the user that a command was not received by the display the user is trying to control). A client device acting as a sender can use a client application installed on the client device to generate and send control data. Alternatively, a client device can use a web browser to navigate to a website and use the website to generate and send control data. If a client device uses a web site rather than a client application, the website can act as the sender on behalf of the client device.

In an exemplary scenario, a large, public LED display in the lobby of a building shows a time-limited proximity code and registers itself with a cloud server on the Internet as a receiver waiting for a session with the time-limited proximity code. The receiver creates a unique, time-limited proximity code, opens a session with the relay server passing in the code, and displays the code. At a website or in a custom client application, a user enters the time-limited proximity code and their Gamertag into a client device (e.g., a smart phone). Alternatively, a user can enter a different user ID, or user identification can be performed without user input of a user ID. The code and Gamertag are communicated (e.g., via an access token in a Register message) over the Internet to the same cloud server, which acts as a relay server. The cloud server can then confirm the accuracy of the time-limited proximity code. Alternatively, another entity (e.g., the receiver) can confirm the accuracy of the code. The cloud server generates a unique session identifier and sends it to the client device. The cloud server also sends the session identifier and the user's Gamertag to the receiver, which displays an avatar associated with the user's Gamertag. Alternatively, another entity (e.g., the receiver) can generate and/or send the session identifier. Avatar data (e.g., personalized avatar appearance data) can be obtained from the cloud server or some other entity. With connections now established, the client device provides an interface (e.g., six buttons in a graphical user interface) through which the user can issue commands to cause the avatar to perform actions (e.g., laugh, cry, jump). When the user activates a button, a Send message is sent to the cloud server which then relays control data corresponding to the user's command to the receiver. The display can then perform an operation to cause the avatar to respond to the user's command. A lack of activity by the user can cause a session timeout.

In this exemplary communication protocol, a public HTTP relay service relays messages between a sender (e.g., a closed sender) and a receiver (e.g., a closed receiver) with unidirectional message passing from the sender to the receiver. The receiver establishes one active session with one sender. However, extensions and alternatives to the described exemplary protocol are possible. For example, although some described examples demonstrate one-way communication from sender to receiver, the protocol can be extended to passing messages from the receiver to the sender (e.g., in a two-way communication scenario). As another example, multiple sessions or shared sessions can be used.

V. Exemplary Techniques

Figure 7:
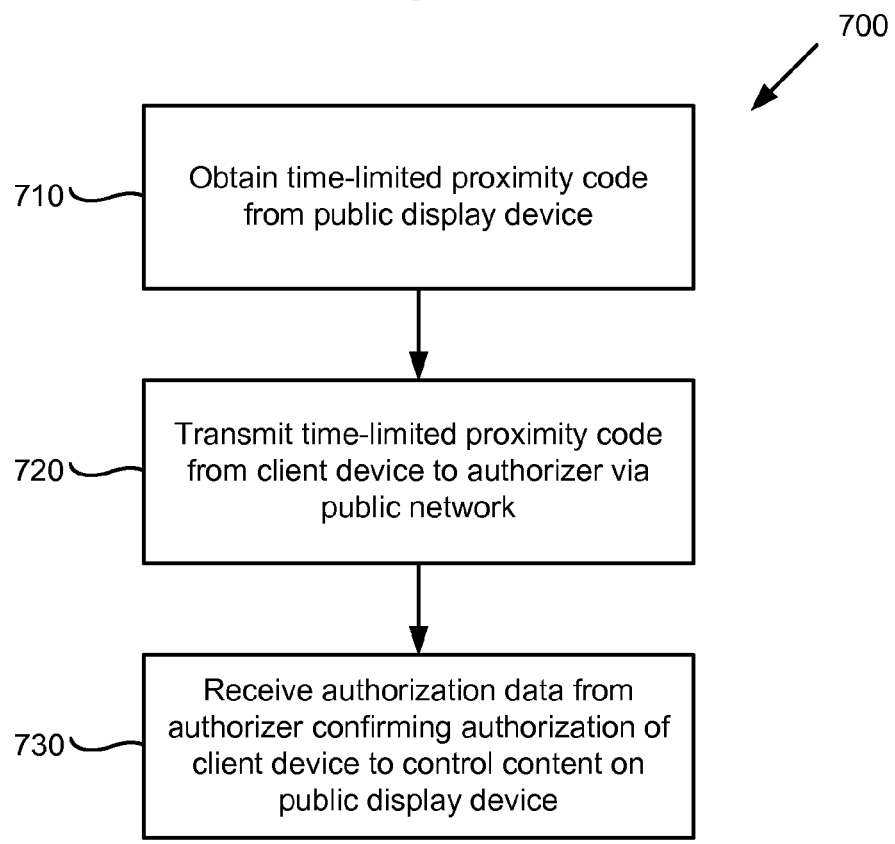
FIG. 7 is a flow chart showing an exemplary technique for obtaining authorization for a client device to control content displayed on a public display device, according to one or more described embodiments.

FIG. 7 is a flow chart showing an exemplary technique 700 for obtaining authorization for a client device to control content displayed on a public display device. A client device such as a mobile device 100 or other device performs the technique 700.

At 710, the client device obtains a time-limited proximity code from the public display device. The time-limited proximity code can include, for example, visual information (e.g., text, graphics or images) or audio information (e.g., a tone or set of tones). At 720, the client device transmits the time-limited proximity code from the client device to an authorizer via a public network. The authorizer can be, for example, a server connected to the public network. At 730, the client device receives authorization data from the authorizer via the public network. The authorization data confirms that the client device is authorized to control content displayed on the public display device. The authorization data can comprise a session identifier that identifies an HTTP session. The client device can transmit control data (e.g., via an HTTP session) to the public display device. For example, the client device can display a graphical user interface (e.g., on a touchscreen) comprising elements (e.g., software buttons) corresponding to commands for controlling content displayed on the public display device. The client device can receive user input via the graphical user interface and transmit control data based on the user input. The control data can comprise, for example, an avatar control command operable to cause the public display device to display an avatar action (e.g., waving, jumping) or a game control command operable to cause the public display device to display a game action in a game (e.g., moving a game element in a single-player or multi-player game). The client device can transmit authentication data (e.g., a user ID such as a Gamertag, cryptographic information) which can be entered by a user (e.g., in response to a prompt) or obtained in some other way (e.g., from authentication credentials already in storage on the client device). A client device can use a custom display device control application, a web browser application, or some other application to perform acts related to control of the public display device.

Figure 8:
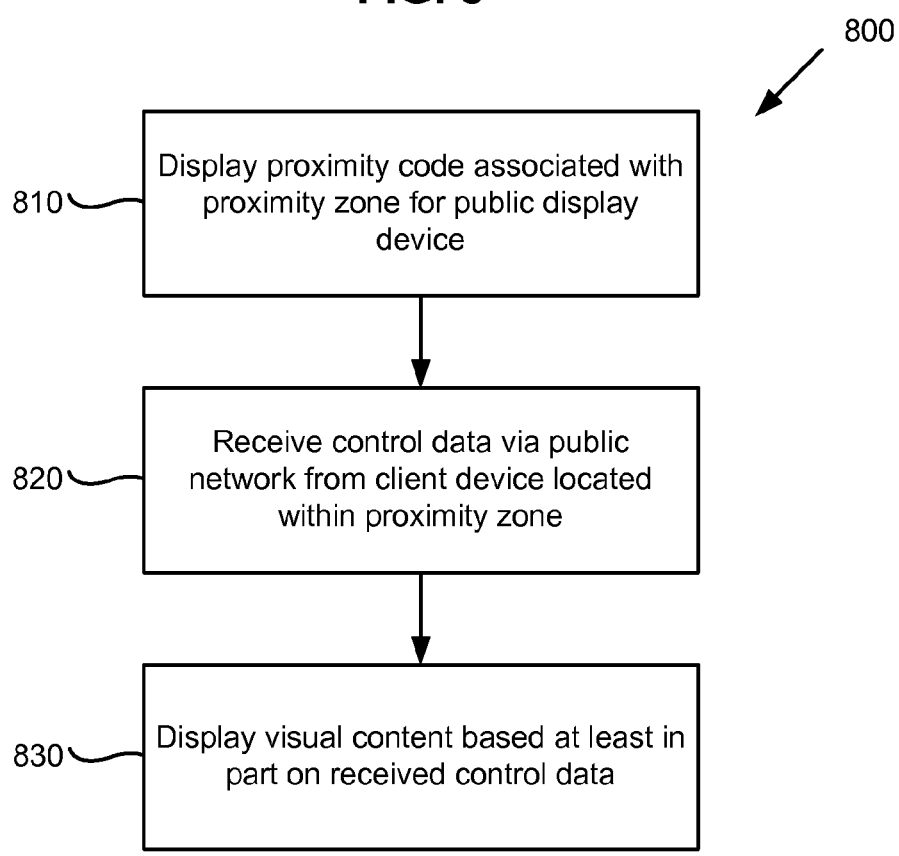
FIG. 8 is a flow chart showing an exemplary technique for displaying visual content based on control data received via a public network from a client device located within a proximity zone, according to one or more described embodiments.

FIG. 8 is a flow chart showing an exemplary technique 800 for displaying visual content based on control data received via a public network from a client device located within a proximity zone. A public display device or other computing device performs the technique 800.

At 810, a public display device displays a proximity code associated with a proximity zone for the public display device. At 820, the public display device receives (e.g., via an HTTP session) control data (e.g., display control data such as avatar control commands) via a public network from a client device located within the proximity zone. At 830, the public display device displays visual content (e.g., an avatar, a user ID associated with the avatar, and/or other content) based at least in part on the received control data. The public display device also can receive other control data from one or more additional client devices located within the proximity zone, and the displayed visual content can be further based on the control data received from the additional client devices.

Figure 9:
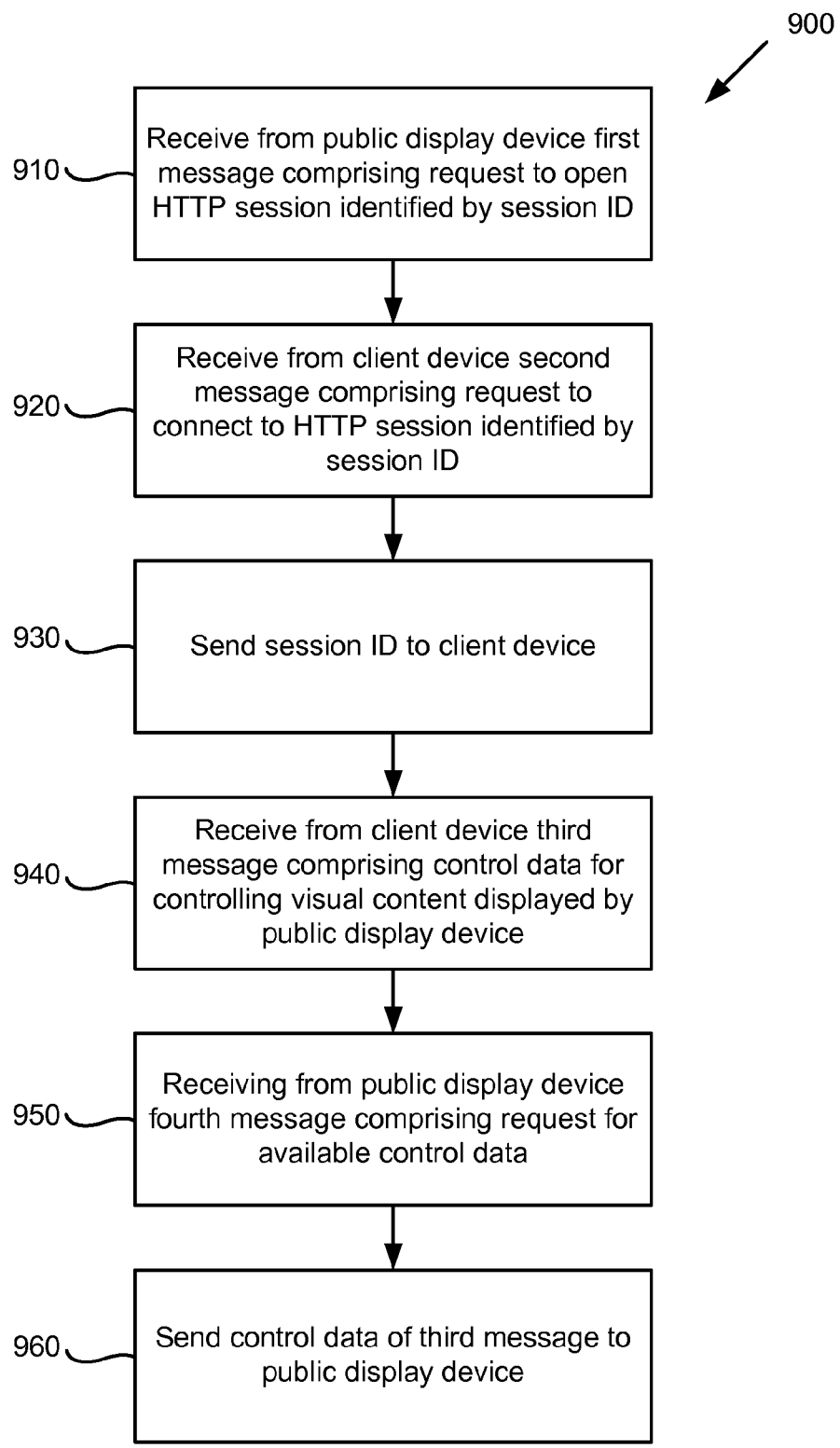
FIG. 9 is a flow chart showing an exemplary technique for providing a relay service to facilitate communications between a public display device and a client device that controls the public display device, according to one or more described embodiments.

FIG. 9 is a flow chart showing an exemplary technique 900 for providing a relay service to a public display device and a client device that controls the public display device. A computing device such as a server or other computing device performs the technique 900.

At 910, the server receives from the public display device a first message comprising a request to open an HTTP session identified by a session identifier (e.g., a session identifier generated by the public display device or the server). At 920, the server receives from the client device a second message comprising a request to connect to the HTTP session identified by the session identifier. At 930, responsive to the second message, the server sends the session identifier to the client device. At 940, the server receives from the client device a third message comprising control data for controlling visual content displayed by the public display device. At 950, the server receives from the public display device a fourth message comprising a request for available control data. At 960, responsive to the fourth message, the server sends the control data contained in the third message to the public display device.

In any of the above techniques, any combination of the commands and operations described herein can be applied. Depending on implementation and the type of processing desired, processing stages shown in example techniques can be rearranged, added, omitted, split into multiple stages, combined with other stages, and/or replaced with like stages.

VI. Exemplary Computing Environment

Figure 10:
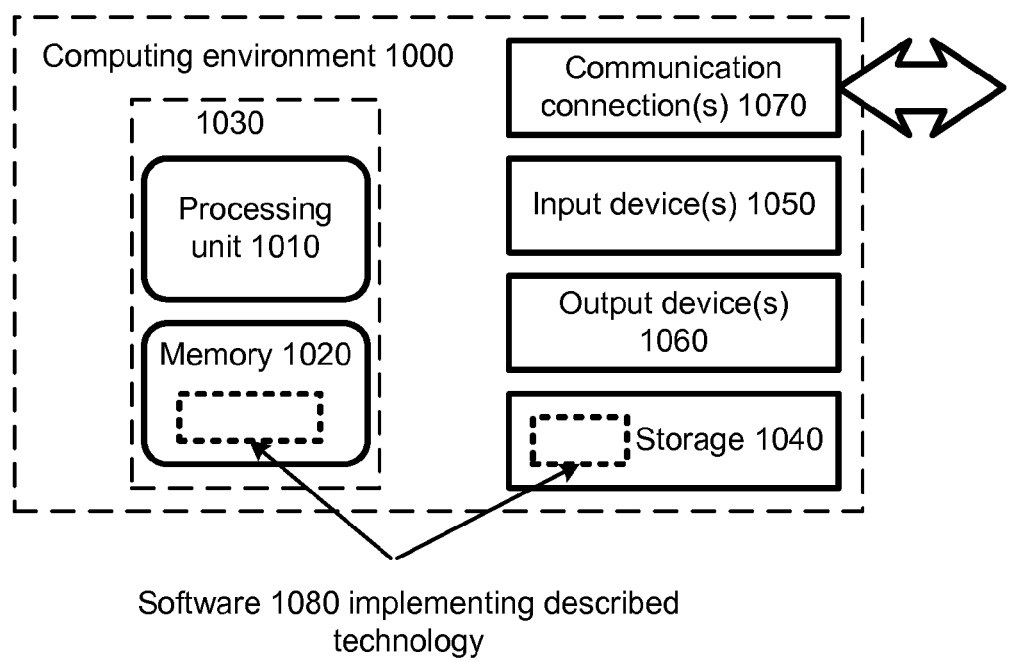
FIG. 10 illustrates a generalized example of a suitable computing environment in which one or more of the described embodiments may be implemented.

FIG. 10 illustrates a generalized example of a suitable computing environment 1000 in which the described technologies can be implemented. The computing environment 1000 is not intended to suggest any limitation as to scope of use or functionality, as the technologies may be implemented in diverse general-purpose or special-purpose computing environments.

With reference to FIG. 10, the computing environment 1000 includes at least one processing unit 1010 coupled to memory 1020. In FIG. 10, this basic configuration 1030 is included within a dashed line. The processing unit 1010 executes computer-executable instructions. In a multi-processing system, multiple processing units execute computer-executable instructions to increase processing power. The memory 1020 may be non-transitory memory, such as volatile memory (e.g., registers, cache, RAM), non-volatile memory (e.g., ROM, EEPROM, flash memory, etc.), or some combination of the two. The memory 1020 can store software 1080 implementing any of the technologies described herein.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other non-transitory computer-readable media which can be used to store information and which can be accessed within the computing environment 1000. The storage 1040 can store software 1080 containing instructions for any of the technologies described herein.

The input device(s) 1050 may be a touch input device such as a keyboard, touchscreen, mouse, pen, or trackball, a voice input device, a scanning device, or another device that provides input to the computing environment 1000. The output device(s) 1060 may be a display, printer, speaker, CD- or DVD-writer, or another device that provides output from the computing environment 1000. Some input/output devices, such as a touchscreen, may include both input and output functionality.

The communication connection(s) 1070 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

Any of the methods described herein can be implemented by computer-executable instructions stored in one or more non-transitory computer-readable storage devices (e.g., memory, CD-ROM, CD-RW, DVD, or the like). Such instructions can cause a computer to perform the method.

VII. Extensions and Alternatives

Various alternatives to the implementations described herein are possible. For example, user interfaces described with reference to diagrams can be altered by changing the content or arrangement of user interface features shown in the diagrams, by omitting certain features, etc. As another example, although some implementations are described with reference to specific devices and user input mechanisms (e.g., mobile devices with a touchscreen interface), described techniques and tools can be used with other devices and/or user input mechanisms.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computerized method comprising:
   by a client device, obtaining a public time-limited proximity code from a public display device, wherein the public time-limited proximity code can be concurrently used by a plurality of client devices located within a proximity zone associated with the public display device;
   transmitting the public time-limited proximity code from the client device to an authorizer via a public network;
   by the client device, based at least in part on the transmitted public time-limited proximity code, receiving authorization data from the authorizer via the public network confirming authorization of the client device to control content displayed on the public display device; and
   transmitting control data from the client device to the public display device via a hypertext transfer protocol (HTTP) relay server that performs connections parking, the connections parking comprising at least one of:
   maintaining an open connection with the client device while awaiting establishment of a connection with the public display; or
   maintaining an open connection with the public display while awaiting control data from the client device.

2. The method of claim 1, wherein the authorization data comprises a session identifier that identifies an HTTP session established with the HTTP relay server.

3. The method of claim 1 wherein the control data comprises an avatar control command.

4. The method of claim 1 wherein the control data comprises a game control command operable to cause the public display device to display a game action in a game.

5. The method of claim 4 wherein the game comprises a multi-player game.

6. The method of claim 1 wherein the control data comprises a command selected from a limited set of commands.

7. The method of claim 1 further comprising transmitting authentication data from the client device via the public network.

8. The method of claim 7 wherein the authentication data comprises a user ID.

9. The method of claim 7 wherein the authentication data comprises cryptographic information.

10. The method of claim 7 wherein the authentication data is obtained from storage on the client device.

11. The method of claim 1 wherein the time-limited proximity code comprises visual information or audio information.

12. The method of claim 1 wherein the client device comprises a custom display device control application, and wherein the client device uses the custom display device control application to perform one or more of the recited steps.

13. The method of claim 1 wherein the client device comprises a web browser application, and wherein the client device uses the web browser application to perform one or more of the recited steps.

14. The method of claim 1 wherein the client device comprises a mobile device having a touchscreen, the method further comprising:
   displaying a graphical user interface on the touchscreen, the graphical user interface comprising one or more elements corresponding to commands for controlling content displayed on the public display device; and receiving user input via the graphical user interface, wherein
the control data transmitted from the client device to the public display device is based on the user input received via the graphical user interface.

15. One or more computer-readable memory having stored thereon computer-executable instructions operable to cause a public display device to perform a method, the method comprising:
prior to receiving communications from a first client device located within a proximity zone for the public display device, displaying a proximity code that enables the first client device to control content displayed on the public display device;
receiving, through a relay server, first control data via a public network from the first client device located within the proximity zone, the relay server configured to perform connections parking, the connections parking comprising at least one of:
maintaining an open connection with the first client device while awaiting establishment of a connection with the public display device; or
maintaining an open connection with the public display device while awaiting control data from the first client device; and
displaying visual content based at least in part on the received first control data.

16. The computer-readable memory of claim 15 wherein the relay server is a hypertext transfer protocol (HTTP) relay server, and wherein the first control data is received via an HTTP session.

17. The computer-readable memory of claim 15 further comprising receiving second control data via the public network from a second client device located within the proximity zone, wherein the displayed visual content is further based on the second control data.

18. The computer-readable memory of claim 15 wherein the displayed visual content comprises an avatar associated with a user of the first client device, and wherein the first control data comprises an avatar control command.

19. The computer-readable memory of claim 18 wherein the displayed visual content further comprises a user ID associated with the avatar.

20. A mobile device configured to control public displays, the mobile device comprising:
a processor;
at least one computer-readable memory storing a computer-executable public output device control module configured to:
communicate a public time-limited proximity code obtained from a public display device to an authorizer, wherein the public time-limited proximity code can be used by a plurality of mobile devices located within a proximity zone of the public display device to control content displayed on the public display device;
based at least in part on the public time-limited proximity code, receive authorization data from the authorizer confirming authorization of the mobile device to control content displayed on the public display device; and
transmit control data that controls display of content on the public display device, the control data reflecting user input provided to the mobile device, wherein the control data is transmitted from the mobile device to the public display device via a hypertext transfer protocol (HTTP) relay server that performs connections parking, the connections parking comprising at least one of:
maintaining an open connection with the mobile device while awaiting establishment of a connection with the public display device; or
maintaining an open connection with the public display device while awaiting control data from the mobile device.

* * * * *